US012559411B2

(12) United States Patent

Hu et al.

(10) Patent No.: US 12,559,411 B2

(45) Date of Patent: Feb. 24, 2026

(54) RARE EARTH-DOPED REINFORCED GLASS-CERAMIC, AND PREPARATION METHOD AND USE THEREFOR

(71) Applicant: CHONGQING AUREAVIA HI-TECH GLASS CO., LTD, Chongqing (CN)

(72) Inventors: Wei Hu, Shenzhen (CN); Baoquan Tan, Shenzhen (CN); Yanqi Zhang, Shenzhen (CN); Fanghua Chen, Shenzhen (CN)

(73) Assignee: CHONGQING AUREAVIA HI-TECH GLASS CO., LTD., Chongqing (CN)

(*) Notice: Subject to any disclaimer, the term of this patent is extended or adjusted under 35 U.S.C. 154(b) by 892 days.

(21) Appl. No.: 17/786,096

(22) PCT Filed: Dec. 11, 2020

(86) PCT No.: PCT/CN2020/135812

§ 371 (c)(1),
(2) Date: Jun. 16, 2022

(87) PCT Pub. No.: WO2021/121165

PCT Pub. Date: Jun. 24, 2021

(65) Prior Publication Data

US 2023/0023010 A1 Jan. 26, 2023

(30) Foreign Application Priority Data

Dec. 17, 2019 (CN) .......................... 201911299207.2

(51) Int. Cl.
| | |
|---|---|
| *C03C 3/097* | (2006.01) |
| *C03C 10/00* | (2006.01) |
| *C03C 21/00* | (2006.01) |

(52) U.S. Cl.
CPC .......... *C03C 3/097* (2013.01); *C03C 10/0018* (2013.01); *C03C 10/0054* (2013.01); *C03C 21/002* (2013.01)

(58) Field of Classification Search
CPC . C03C 10/0018; C03C 10/0027; C03C 10/00; C03C 10/0009
See application file for complete search history.

(56) References Cited

U.S. PATENT DOCUMENTS

| | | | |
|---|---|---|---|
| 3,977,886 A | 8/1976 | Muller | |
| 4,415,672 A | 11/1983 | Brennan et al. | |
| 2010/0215993 A1 | 8/2010 | Goto et al. | |

FOREIGN PATENT DOCUMENTS

| | | | | |
|---|---|---|---|---|
| CN | 106219983 A | 12/2016 | | |
| CN | 106660860 A | 5/2017 | | |
| CN | 107902909 A | 4/2018 | | |
| CN | 110104954 A | * 8/2019 | ......... | C03C 10/0009 |
| CN | 110104955 A | 8/2019 | | |
| CN | 111087175 A | 5/2020 | | |
| EP | 0095433 A1 | 11/1983 | | |
| JP | 2015520097 A | 7/2015 | | |
| WO | 2019105250 A1 | 6/2019 | | |

OTHER PUBLICATIONS

CN110104954A machine translation (Year: 2019).*
Irshad, K. A., et al. "Pressure induced structural phase transition in rare earth sesquioxide Tm2O3: Experiment and ab initio calculations." Journal of Applied Physics 124.15 (2018). (Year: 2018).*
International Search Report for PCT/CN2020/135812, mailed Mar. 12, 2021, 6 pages.
Extended EP Search Report mailed Jan. 8, 2024, EP App No. 20902927.1-1108, 5 pages.

* cited by examiner

*Primary Examiner* — Cameron K Miller
(74) *Attorney, Agent, or Firm* — Cozen O'Connor

(57) ABSTRACT

Provided in the present invention is a rare earth-doped reinforced glass-ceramic, and a preparation method and a use therefor. Raw materials rare earth-doped reinforced glass-ceramic comprise at least one of the following rare earth oxides: $Ta_2O_5$, $La_2O_3$, $Y_2O_3$, $Tm_2O_3$, or $Nb_2O_5$. In the present invention, a glass article doped with at least one rare earth oxide from among $Ta_2O_5$, $La_2O_3$, $Y_2O_3$, $Tm_2O_3$, or $Nb_2O_5$ is subjected to thermal treatment and ion exchange to produce the rare-earth doped reinforced glass-ceramic. In the rare earth-doped reinforced glass-ceramic, due to the high field strength and high accumulation effects of the rear earth element, the crystal size of the glass-ceramic is caused to low, and the crystal ratio thereof to be high, thus being able to effectively improve the mechanical performance and visible light transmittance of the glass-ceramic, and effectively controlling uniform devitrification of the glass. The invention is suitable for use in cover panels of electronic devices.

20 Claims, No Drawings

RARE EARTH-DOPED REINFORCED GLASS-CERAMIC, AND PREPARATION METHOD AND USE THEREFOR

FIELD OF THE INVENTION

The present invention belongs to the technical field of glass production and manufacture, and relates to a glass ceramic, particularly to a reinforced glass ceramic doped with rare earth and the preparation process and use thereof.

BACKGROUND OF THE INVENTION

With the popularization of large-area touch-screen electronic products such as smartphones and tablet computers, consumers have put forward higher requirements for the damage-resistance of display screens, such as impact resistance, drop impact resistance, scratch resistance, etc. Therefore, major terminal manufacturers constantly update screen protection materials. Due to the low strength and poor light transmittance of the conventional acrylic board, glass has been widely used in the field of screen protection instead of acrylic or other polymer materials because of its characteristics such as excellent transparency, hardness, corrosion resistance, easy processing and molding, and the like.

Glass ceramic is a good choice for seeking further improvements in the impact resistance and chemical corrosion resistance of glass. Glass ceramic, also known as microcrystalline glass, is a kind of composite material that combines crystal phase and glass phase, which suffers from high temperature melting, molding and heat-treating in the preparation process. It has excellent properties such as high mechanical strength, adjustable thermal expansion performance, high thermal shock resistance, high chemical corrosion resistance, low dielectric loss, and the like.

At present, the commercial-available glass ceramic products involve the following problems: large crystal size leads to poor visible light transmittance; low crystal proportion leads to low mechanical strength; low field strength and poor accumulation effect of the elements contained result in uneven crystallization, and so on. These problems preclude glass ceramic products from being used in large-area touch-screen electronic products such as smartphones and tablet computers. Therefore, the development of a glass ceramic with small crystal size, high crystal ratio, high mechanical property, high visible light transmittance and homogeneous crystallization has become an urgent technical problem to be solved.

SUMMARY OF THE INVENTION

The technical problem to be solved by the present invention is to provide a reinforced glass ceramic doped with rare earth, and preparation process and use thereof. Such reinforced glass ceramic doped with rare earth has small crystal size and a high crystal ratio due to the high field strength and high accumulation effect of the rear earth elements, which can effectively improve the mechanical properties and visible light transmittance of the glass ceramic, as well as effectively control the homogeneous crystallization of glass.

In order to solve the above-mentioned technical problems, the technical solutions of the present invention are provided as follows.

In one aspect, the present invention provides a reinforced glass ceramic doped with rare earth, and the raw material of glass ceramic doped with rare earth, and the raw material of the reinforced glass ceramic comprises at least one of the following rare earth oxides: $Ta_2O_5$, $La_2O_3$, $Y_2O_3$, $Tm_2O_3$, $Nb_2O_5$.

Further, the reinforced glass ceramic is prepared from the following components in mole percentage: from 65% to 75% of $SiO_2$, from 3% to 12% of $Al_2O_3$, from 0.5% to 5% of $P_2O_5$, from 0% to 3% of $B_2O_3$, from 0% to 5% of MgO, from 0% to 3% of ZnO, from 0.5% to 5% of $ZrO_2$, from 0% to 1.5% of $TiO_2$, from 0.5% to 6% of $Na_2O$, from 10% to 25% of $Li_2O$, from 0% to 0.3% of $CeO_2$, from 0% to 0.5% of $SnO_2$, and at least one of the following rare earth oxides: from 0% to 6% of $Ta_2O_5$, from 0% to 6% of $La_2O_3$, from 0% to 6% of $Y_2O_3$, from 0% to 6% of $Tm_2O_3$, and from 0% to 6% $Nb_2O_5$.

Further, the rare earth oxides have a mole percent of 6% or less.

Further, a crystal phase of the reinforced glass ceramic is at least one of lithium disilicate, $ZrO_2$ crystal, β-quartz solid solution, and petalite, and the crystal phase has a crystal size ranging from 10-80 nm.

Further, the crystal phase has a crystal size ranging from 20-60 nm.

Further, the reinforced glass ceramic has a molar volume of 24.5 $cm^3$/mol or less, wherein the molar volume of the reinforced glass ceramic is calculated according to the equation: $V_m = \Sigma x_i M_i / \rho$, where $V_m$ is the molar volume of the reinforced glass ceramic; $x_i$ and $M_i$ are the molar fraction and molar mass of each oxide constituting the reinforced glass ceramic, respectively; and $\rho$ is the density of the glass substrate of the reinforced glass ceramic.

Further, the reinforced glass ceramic has a tensile strength linear density ranging from 20000 to 70000 MPa/mm, a depth of compressive stress layer of 70 μm or more, and a surface compressive stress of 500 MPa or more.

Further, the reinforced glass ceramic has a tensile stress linear density ranging from 30000-50000 MPa/mm, a depth of compressive stress layer of 90 μm or more, and a surface compressive stress of 800 MPa or more.

Further, the reinforced glass ceramic has a Young's modulus of 80 GPa or more, and an average visible light transmittance of 89% or more.

Another aspect of the present invention provides a method for preparing a reinforced glass ceramic doped with rare earth, comprising the following steps:

S1. preparing a glass article as a glass ceramic precursor according to the mole percent of each raw material;

S2. heat-treating the glass article obtained in step S1 to obtain a glass ceramic; and S3. performing an ion exchange on the glass ceramic obtained in step S2 to prepare the reinforced glass ceramic.

Further, the step S2 specifically comprises:

S21. performing a first heat treatment on the glass article obtained in step S1;

S22. performing a second heat treatment on the product obtained in step S21 to prepare the glass ceramic.

Further, the first heat treatment is performed at a temperature of 500-650° C. for a time of 0.5-5 hours.

Further, the second heat treatment is performed the temperature of 600-750° C. and for a time of 0.5-5 hours.

Further, the ion exchange is a kind of single chemical strengthening or multiple chemical strengthening in a salt bath, wherein the salt bath comprises at least one of potassium salt bath, sodium salt bath, and lithium salt bath, and wherein the potassium salt is $KNO_3$, the sodium salt is $NaNO_3$ or $NaNO_2$, and the lithium salt is $LiNO_3$.

Further, in the salt bath for a single chemical strengthening, the mass fraction of the sodium salt ranges from 0.5-30%, the mass fraction of the lithium salt ranges from 0-5%, and the mass fraction of the potassium salt ranges from 65-100%.

Further, the multiple chemical strengthening is a double chemical strengthening, and the salt bath for the double chemical strengthening comprises a first salt bath and a second salt bath.

Further, the first salt bath comprises a sodium salt with a mass fraction in the range of 30-100%, and a potassium salt with the mass fraction in the range of 0-70%.

Further, the second salt bath comprises a sodium salt with a mass fraction in the range of 0-15%, a lithium salt with a mass fraction in the range of 0-5%, and a potassium salt with a mass fraction in the range of 80-100%.

Further, the single chemical strengthening or multiple chemical strengthening is performed at a temperature of 400-520° C. for a total time of 2-20 hours.

In yet another aspect, the present invention provides use of a reinforced glass ceramic doped with rare earth in a cover plate of an electronic product.

The beneficial effects of the present invention are as follows.

The present invention provides a reinforced glass ceramic doped with rare earth, which is produced with a glass article doped with at least one rare earth oxides chosen among $Ta_2O_5$, $La_2O_3$, $Y_2O_3$, $Tm_2O_3$, and $Nb_2O_5$, through heat-treating and ion-exchanging. Such reinforced glass ceramic doped with rare earth has small crystal size and a high crystal ratio due to the high field strength and high accumulation effect of the rear earth elements, which can effectively improve the mechanical properties and visible light transmittance of glass ceramic, as well as effectively control the homogeneous crystallization of glass. In addition, the reinforced glass ceramic doped with rare earth can be applied to the cover plate of electronic products, further improving the overall performance of the cover plate of electronic products.

DETAILED DESCRIPTION OF THE INVENTION

In order to describe the technical content, structural features, objects and effects achieved of the present invention in detail, the following detailed descriptions are provided in conjunction with the embodiments.

One aspect of the present invention provides a reinforced glass ceramic doped with rare earth, and the raw material of the reinforced glass ceramic comprises at least one of the following rare earth oxides: $Ta_2O_5$, $La_2O_3$, $Y_2O_3$, $Tm_2O_3$, $Nb_2O_5$.

Another aspect of the present invention provides a method for preparing the reinforced glass ceramic doped with rare earth provided by the present invention, comprising the following steps:

S1. preparing a glass article as a glass ceramic precursor according to the mole percent of each raw material;

S2. heat-treating the glass article obtained in step S1 to obtain a glass ceramic; and S3. performing an ion exchange on the glass ceramic obtained in step S2 to prepare the reinforced glass ceramic.

Another aspect of the present invention provides use of the reinforced glass ceramic doped with rare earth provided by the present invention in a cover plate of an electronic product.

As can be seen from the above description, the reinforced glass ceramic doped with rare earth and the preparation method and use thereof provided by the present invention have the following beneficial effects.

The present invention provides a reinforced glass ceramic doped with rare earth, which is produced with a glass article doped with at least one rare earth oxides chosen among $Ta_2O_5$, $La_2O_3$, $Y_2O_3$, $Tm_2O_3$, and $Nb_2O_5$, through heat-treating and ion-exchanging. Such reinforced glass ceramic doped with rare earth has small crystal size and a high crystal ratio due to the high field strength and high accumulation effect of the rear earth elements, which can effectively improve the mechanical properties and visible light transmittance of glass ceramic, as well as effectively control the homogeneous crystallization of glass. In addition, the reinforced glass ceramic doped with rare earth can be applied to the cover plate of electronic products, further improving the overall performance of the cover plate of electronic products.

EXAMPLE 1

In a specific embodiment, the present invention provided a reinforced glass ceramic doped with rare earth, wherein the raw material of the reinforced glass ceramic comprises rare earth oxide $La_2O_3$, the reinforced glass ceramic comprises the crystal phase of petalite, and crystals in a crystal phase of the reinforced glass ceramic have a size range of 10-20 nm.

In this example, the reinforced glass ceramic doped with rare earth was prepared from the following components in mole percentage: 65 mol % of $SiO_2$, 12 mol % of $Al_2O_3$, 0.5 mol % of $P_2O_5$, 1 mol % of $ZrO_2$, 0.5 mol % of $Na_2O$, 19.7 mol % of $Li_2O$, 0.3 mol % of $CeO_2$, 0.1 mol % of $SnO_2$, and 0.9 mol % of $La_2O_3$.

To be illustrative, the rare earth oxide has a mole percent of 0.9 mol %.

The reinforced glass ceramic has a molar volume of 24.1 cm³/mol, wherein the molar volume of the reinforced glass ceramic was calculated according to the equation: $V_m = \Sigma x_i M_i / \rho$, where $V_m$ is the molar volume of the reinforced glass ceramic; $x_i$ and $M_i$ are the molar fraction and molar mass of each oxide constituting the reinforced glass ceramic, respectively; and $\rho$ is the density of the glass article of the reinforced glass ceramic.

To be illustrative, the reinforced glass ceramic has a tensile strength linear density of 70000 MPa/mm, a depth of compressive stress layer of 140 μm, and a surface compressive stress of 650 MPa.

In addition, the reinforced glass ceramic has a Young's modulus of 89.2 GPa, and an average visible light transmittance of 91.5%.

This example also provided a method for preparing the reinforced glass ceramic doped with rare earth, comprising:

a. preparing a glass article as a glass ceramic precursor according to the mole percent of each raw material;

b. performing a first heat treatment on the glass article obtained in step a at 600° C. for 0.5 hour;

c. performing a second heat treatment on the product obtained in step b at 660° C. for 1 hour to obtain a glass ceramic;

d. performing an ion-exchanging on the glass ceramic obtained in step c in a salt bath containing 10% $NaNO_3$ and 90% $KNO_3$ at 420° C. for 4 hours, to prepare the reinforced glass ceramic.

The reinforced glass ceramic doped with rare earth was prepared by heat-treating and ion-exchanging the glass article doped with rare earth oxide $La_2O_3$. This reinforced glass ceramic doped with rare earth has small crystal size and a high crystal ratio due to the high field strength and high accumulation effect of the rear earth elements, which could effectively improve the mechanical properties and visible light transmittance of glass ceramic, as well as effectively control the homogeneous crystallization of glass. It can be used for cover plates of electronic devices.

EXAMPLE 2

In a specific embodiment, the present invention provided a reinforced glass ceramic doped with rare earth, wherein the raw material of the reinforced glass ceramic comprises rare earth oxide $Ta_2O_5$, the reinforced glass ceramic comprises the crystal phase of lithium disilicate and β-quartz solid solution, and the crystals in a crystal phase of the reinforced glass ceramic have a size range of 35-45 nm.

In this example, the reinforced glass ceramic doped with rare earth was prepared from the following components in mole percentage: 75 mol % of $SiO_2$, 3 mol % of $Al_2O_3$, 1 mol % of $P_2O_5$, 1 mol % of $B_2O_3$, 0.8 mol % of MgO, 0.5 mol % of ZnO, 1.5 mol % of $ZrO_2$, 1 mol % of $Na_2O$, 10 mol % of $Li_2O$, 0.3 mol % of $CeO_2$, 0.15 mol % of $SnO_2$, and 6 mol % of $Ta_2O_5$.

To be illustrative, the rare earth oxide has a mole percent of 6 mol %. The reinforced glass ceramic has a molar volume of 22.1 cm³/mol, wherein the molar volume of the reinforced glass ceramic was calculated according to the equation: $V_m = \Sigma x_i M_i / \rho$, where $V_m$ is the molar volume of the reinforced glass ceramic; $x_i$ and $M_i$ are the molar fraction and molar mass of each oxide constituting the reinforced glass ceramic, respectively; and $\rho$ is the density of the glass article of the reinforced glass ceramic.

To be illustrative, the reinforced glass ceramic has a tensile strength linear density of 40000 MPa/mm, a depth of compressive stress layer of 90 μm, and a surface compressive stress of 710 MPa.

In addition, the reinforced glass ceramic has a Young's modulus of 84.5 GPa, and an average visible light transmittance of 90.4%.

This example also provided a method for preparing the reinforced glass ceramic doped with rare earth, comprising:

a. preparing a glass article as a glass ceramic precursor according to the mole percent of each raw material;

b. performing a first heat treatment on the glass article obtained in step a at 560° C. for 2.5 hours;

c. performing a second heat treatment on the product obtained in step b at 610° C. for 2 hours to obtain a glass ceramic;

d. performing a first ion exchanging on the glass ceramic prepared in step c in a first salt bath containing 100% of $NaNO_3$ at 450° C. for 3 hours;

e. performing a second ion exchanging on the product obtained in step d in a second salt bath containing 15% of $NaNO_3$ and 90% of $KNO_3$ at 450° C. for 2 hours to prepare the reinforced glass ceramic.

The reinforced glass ceramic doped with rare earth was prepared by heat-treating and ion-exchanging the glass article doped with rare earth oxide $Ta_2O_5$. This reinforced glass ceramic doped with rare earth has small crystal size and a high crystal ratio due to the high field strength and high accumulation effect of the rear earth elements, which could effectively improve the mechanical properties and visible light transmittance of glass ceramic, as well as effectively control the homogeneous crystallization of glass. It can be used for cover plates of electronic devices.

EXAMPLE 3

In a specific embodiment, the present invention provided a reinforced glass ceramic doped with rare earth, wherein the raw material of the reinforced glass ceramic comprises rare earth oxide $Tm_2O_3$, the reinforced glass ceramic comprises the crystal phase of $ZrO_2$ and petalite, and crystals in a crystal phase of the reinforced glass ceramic have a size range of 30-40 nm.

In this example, the reinforced glass ceramic doped with rare earth was prepared from the following components in mole percentage: 69 mol % of $SiO_2$, 5 mol % of $Al_2O_3$, 5 mol % of $P_2O_5$, 1 mol % of MgO, 5 mol % of $ZrO_2$, 2 mol % of $Na_2O$, 11 mol % of $Li_2O$, and 2 mol % of $Tm_2O_3$.

To be illustrative, the rare earth oxide has a mole percent of 2 mol %.

The reinforced glass ceramic has a molar volume of 23.8 cm³/mol, wherein the molar volume of the reinforced glass ceramic was calculated according to the equation: $V_m = \Sigma x_i M_i / \rho$, where $V_m$ is the molar volume of the reinforced glass ceramic; $x_i$ and $M_i$ are the molar fraction and molar mass of each oxide constituting the reinforced glass ceramic, respectively; and $\rho$ is the density of the glass article of the reinforced glass ceramic.

To be illustrative, the reinforced glass ceramic has a tensile strength linear density of 60000 MPa/mm, a depth of compressive stress layer of 120 μm, and a surface compressive stress of 880 MPa.

In addition, the reinforced glass ceramic has a Young's modulus of 83.1 GPa, and an average visible light transmittance of 90.6%.

This example also provided a method for preparing the reinforced glass ceramic doped with rare earth, comprising:

a. preparing a glass article as a glass ceramic precursor according to the mole percent of each raw material;

b. performing a first heat treatment on the glass article obtained in step a at 580° C. for 4 hours;

c. performing a second heat treatment on the product obtained in step b at 680° C. for 1.5 hours to obtain a glass ceramic;

d. performing a first ion exchanging on the glass ceramic prepared in step c in a first salt bath containing 98% of $NaNO_3$ and 2% of $KNO_3$ at 500° C. for 4 hours;

e. performing a second ion exchanging on the product obtained in step d in a second salt bath containing 5% of $NaNO_3$, 0.2% of $LiNO_3$ and 94.8% of $KNO_3$ at 500° C. for 4 hours to prepare the reinforced glass ceramic.

The reinforced glass ceramic doped with rare earth was prepared by heat-treating and ion-exchanging the glass article doped with rare earth oxide $Tm_2O_3$. This reinforced glass ceramic doped with rare earth has small crystal size and a high crystal ratio due to the high field strength and high accumulation effect of the rear earth elements, which could effectively improve the mechanical properties and visible light transmittance of glass ceramic, as well as effectively control the homogeneous crystallization of glass. It can be used for cover plates of electronic devices.

EXAMPLE 4

In a specific embodiment, the present invention provided a reinforced glass ceramic doped with rare earth, wherein the raw material of the reinforced glass ceramic comprises rare earth oxide $Nb_2O_5$, the reinforced glass ceramic comprises the crystal phase of lithium disilicate, and crystals in a crystal phase of the reinforced glass ceramic have the size of 70-80 nm.

In this example, the reinforced glass ceramic doped with rare earth was prepared from the following components in mole percentage: 66 mol % of $SiO_2$, 4 mol % of $Al_2O_3$, 1.5 mol % of $P_2O_5$, 1.7 mol % of $ZrO_2$, 0.5 mol % of $Na_2O$, 25 mol % of $Li_2O$, 0.1 mol % of $CeO_2$, 0.2 mol % of $SnO_2$, and 1 mol % of $Nb_2O_5$.

To be illustrative, the rare earth oxide has a mole percent of 1 mol %.

The reinforced glass ceramic has a molar volume of 24 $cm^3$/mol, wherein the molar volume of the reinforced glass ceramic was calculated according to the equation: $V_m = \Sigma x_i M_i / \rho$, where $V_m$ is the molar volume of the reinforced glass ceramic; $x_i$ and $M_i$ are the molar fraction and molar mass of each oxide constituting the reinforced glass ceramic, respectively; and $\rho$ is the density of the glass article of the reinforced glass ceramic.

To be illustrative, the reinforced glass ceramic has a tensile strength linear density of 20000 MPa/mm, a depth of compressive stress layer of 110 μm, and a surface compressive stress of 800 MPa.

In addition, the reinforced glass ceramic has a Young's modulus of 87.6 GPa, and an average visible light transmittance of 89%.

This example also provided a method for preparing the reinforced glass ceramic doped with rare earth, comprising:

a. preparing a glass article as a glass ceramic precursor according to the mole percent of each raw material;

b. performing a first heat treatment on the glass article obtained in step a at 500° C. for 5 hours;

c. performing a second heat treatment on the product obtained in step b at 600° C. for 5 hours to obtain a glass ceramic;

d. performing a first ion exchanging on the glass ceramic prepared in step c in a first salt bath containing 90% of $NaNO_3$ and 10% of $KNO_3$ at 400° C. for 5 hours;

e. performing a second ion exchanging on the product obtained in step d in a second salt bath containing 1.5% of $NaNO_3$, 98% of $KNO_3$ and 0.5% of $LiNO_3$ at 400° C. for 15 hours to prepare the reinforced glass ceramic.

The reinforced glass ceramic doped with rare earth was prepared by heat-treating and ion-exchanging the glass article doped with rare earth oxide $Nb_2O_5$. This reinforced glass ceramic doped with rare earth has small crystal size and a high crystal ratio due to the high field strength and high accumulation effect of the rear earth elements, which could effectively improve the mechanical properties and visible light transmittance of glass ceramic, as well as effectively control the homogeneous crystallization of glass. It can be used for cover plates of electronic devices.

EXAMPLE 5

In a specific embodiment, the present invention provided a reinforced glass ceramic doped with rare earth, wherein the raw material of the reinforced glass ceramic comprises rare earth oxide $Y_2O_3$, the reinforced glass ceramic comprises the crystal phase of β-quartz solid solution, and crystals in a crystal phase of the reinforced glass ceramic have a size range of 60-70 nm.

In this example, the reinforced glass ceramic doped with rare earth was prepared from the following components in mole percentage: 70 mol % of $SiO_2$, 7 mol % of $Al_2O_3$, 2 mol % of $B_2O_3$, 3 mol % of ZnO, 2 mol % of $ZrO_2$, 0.5 mol % of $Na_2O$, 12 mol % of $Li_2O$, 0.5 mol % of $SnO_2$, and 3 mol % of $Y_2O_3$.

To be illustrative, the rare earth oxide has a mole percent of 3 mol %.

The reinforced glass ceramic has a molar volume of 22.5 $cm^3$/mol, wherein the molar volume of the reinforced glass ceramic was calculated according to the equation: $V_m = \Sigma x_i M_i / \rho$, where $V_m$ is the molar volume of the reinforced glass ceramic; $x_i$ and $M_i$ are the molar fraction and molar mass of each oxide constituting the reinforced glass ceramic, respectively; and $\rho$ is the density of the glass article of the reinforced glass ceramic.

To be illustrative, the reinforced glass ceramic has a tensile strength linear density of 40000 MPa/mm, a depth of compressive stress layer of 130 μm, and a surface compressive stress of 500 MPa.

In addition, the reinforced glass ceramic has a Young's modulus of 82.9 GPa, and an average visible light transmittance of 89.9%.

This example also provided a method for preparing the reinforced glass ceramic doped with rare earth, comprising:

a. preparing a glass article as a glass ceramic precursor according to the mole percent of each raw material;

b. performing a first heat treatment on the glass article obtained in step a at 650° C. for 1 hour;

c. performing a second heat treatment the product obtained in step b at 750° C. for 3 hours to obtain a glass ceramic;

d. performing an ion-exchanging on the glass ceramic obtained in step c in a salt bath containing 30% of $NaNO_3$ and 70% of $KNO_3$ at 470° C. for 6 hours to prepare the reinforced glass ceramic.

The reinforced glass ceramic doped with rare earth was prepared by heat-treating and ion-exchanging the glass article doped with rare earth oxide $Y_2O_3$. This reinforced glass ceramic doped with rare earth has small crystal size and a high crystal ratio due to the high field strength and high accumulation effect of the rear earth elements, which could effectively improve the mechanical properties and visible light transmittance of glass ceramic, as well as effectively control the homogeneous crystallization of glass. It can be used for cover plates of electronic devices.

EXAMPLE 6

In a specific embodiment, the present invention provided a reinforced glass ceramic doped with rare earth, wherein the raw material of the reinforced glass ceramic comprises rare earth oxides Ta2O5 and $Tm_2O_3$, the reinforced glass ceramic comprises the crystal phases of β-quartz solid solution and lithium disilicate, and crystals in a crystal phase of the reinforced glass ceramic have a size range of 40-50 nm.

In this example, the reinforced glass ceramic doped with rare earth was prepared from the following components in mole percentage: 71 mol % of $SiO_2$, 4.5 mol % of $Al_2O_3$, 3 mol % of $B_2O_3$, 5 mol % of MgO, 0.5 mol % of $ZrO_2$, 1.5 mol % of $TiO_2$, 1.5 mol % of $Na_2O$, 10.85 mol % of $Li_2O$, 0.15 mol % of $SnO_2$, 1 mol % of $Ta_2O_5$, and 1 mol % of $Tm_2O_3$.

To be illustrative, the rare earth oxide has a mole percent of 2 mol %.

The reinforced glass ceramic has a molar volume of 23.6 $cm^3$/mol, wherein the molar volume of the reinforced glass ceramic was calculated according to the equation: $V_m = \Sigma x_i M_i / \rho$, where $V_m$ is the molar volume of the reinforced glass ceramic; $x_i$ and $M_i$ are the molar fraction and molar mass of each oxide constituting the reinforced glass ceramic, respectively; and $\rho$ is the density of the glass article of the reinforced glass ceramic.

To be illustrative, the reinforced glass ceramic has a tensile strength linear density of 30000 MPa/mm, a depth of compressive stress layer of 115 μm, and a surface compressive stress of 810 MPa.

In addition, the reinforced glass ceramic has a Young's modulus of 85 GPa, and an average visible light transmittance of 90.7%.

This example also provided a method for preparing the reinforced glass ceramic doped with rare earth, comprising:

a. preparing a glass article as a glass ceramic precursor according to the mole percent of each raw material;

b. performing a first heat treatment on the glass article obtained in step a at 620° C. for 2 hours;

c. performing a second heat treatment on the product obtained in step b at 710° C. for 2.5 hours to obtain a glass ceramic;

d. performing a first ion exchanging on the glass ceramic prepared in step c in a first salt bath containing 30% of $NaNO_3$ and 70% of $KNO_3$ at 480° C. for 3 hours;

e. performing a second ion exchanging on the product obtained in step d in a second salt bath containing 8% of $NaNO_3$ and 92% of $KNO_3$ at 480° C. for 1 hour to prepare the reinforced glass ceramic.

The reinforced glass ceramic doped with rare earth was prepared by heat-treating and ion-exchanging the glass article doped with rare earth oxides $Ta_2O_5$ and $Tm_2O_3$. This reinforced glass ceramic doped with rare earth has small crystal size and a high crystal ratio due to the high field strength and high accumulation effect of the rear earth elements, which could effectively improve the mechanical properties and visible light transmittance of glass ceramic, as well as effectively control the homogeneous crystallization of glass. It can be used for cover plates of electronic devices.

EXAMPLE 7

In a specific embodiment, the present invention provided a reinforced glass ceramic doped with rare earth, wherein the raw material of the reinforced glass ceramic comprises rare earth oxide $Y_2O_3$, the reinforced glass ceramic comprises the crystal phases of $ZrO_2$ and β-quartz solid solution, and crystals in a crystal phase of the reinforced glass ceramic have a size range of 50-60 nm.

In this example, the reinforced glass ceramic doped with rare earth was prepared from the following components in mole percentage: 73 mol % of $SiO_2$, 3.5 mol % of $Al_2O_3$, 2 mol % of $P_2O_5$, 1 mol % of ZnO, 3 mol % of $ZrO_2$, 0.5 mol % of $TiO_2$, 6 mol % of $Na_2O$, 10.4 mol % of $Li_2O$, 0.1 mol % of $SnO_2$, and 0.5 mol % of $Y_2O_3$.

To be illustrative, the rare earth oxide has a mole percent of 0.5 mol %.

The reinforced glass ceramic has a molar volume of 24.5 $cm^3/mol$, wherein the molar volume of the reinforced glass ceramic was calculated according to the equation: $V_m=\Sigma x_i M_i/\rho$, where $V_m$ is the molar volume of the reinforced glass ceramic; $x_i$ and $M_i$ are the molar fraction and molar mass of each oxide constituting the reinforced glass ceramic, respectively; and $\rho$ is the density of the glass article of the reinforced glass ceramic.

To be illustrative, the reinforced glass ceramic has a tensile strength linear density of 25000 MPa/mm, a depth of compressive stress layer of 70 µm, and a surface compressive stress of 950 MPa.

In addition, the reinforced glass ceramic has a Young's modulus of 81 GPa, and an average visible light transmittance of 90.1%.

This example also provided a method for preparing the reinforced glass ceramic doped with rare earth, comprising:

a. preparing a glass article as a glass ceramic precursor according to the mole percent of each raw material;

b. performing a first heat treatment on the glass article obtained in step a at 610° C. for 3 hours;

c. performing a second heat treatment on the product obtained in step b at 730° C. for 4 hours to obtain a glass ceramic;

d. performing an ion exchanging on the glass ceramic obtained in step c in a salt bath containing 0.5% of $NaNO_3$ and 99.5% of $KNO_3$ at 520° C. for 2 hours to prepare the reinforced glass ceramic.

The reinforced glass ceramic doped with rare earth was prepared by heat-treating and ion-exchanging the glass article doped with rare earth oxide $Y_2O_3$. This reinforced glass ceramic doped with rare earth has small crystal size and a high crystal ratio due to the high field strength and high accumulation effect of the rear earth elements, which could effectively improve the mechanical properties and visible light transmittance of glass ceramic, as well as effectively control the homogeneous crystallization of glass. It can be used for cover plates of electronic devices.

EXAMPLE 8

In a specific embodiment, the present invention provided a reinforced glass ceramic doped with rare earth, wherein the raw material of the reinforced glass ceramic comprises rare earth oxides $La_2O_3$ and $Nb_2O_5$, the reinforced glass ceramic comprises the crystal phases of lithium disilicate and petalite, and crystals in a crystal phase of the reinforced glass ceramic have a size range of 15-25 nm.

In this example, the reinforced glass ceramic doped with rare earth was prepared from the following components in mole percentage: 67 mol % of $SiO_2$, 7 mol % of $Al_2O_3$, 0.5 mol % of $P_2O_5$, 0.8 mol % of $ZrO_2$, 0.5 mol % of $Na_2O$, 22 mol % of $Li_2O$, 0.2 mol % of $CeO_2$, 1.5 mol % of $La_2O_3$, and 0.5 mol % of $Nb_2O_5$.

To be illustrative, the rare earth oxide has a mole percent of 2 mol %.

The reinforced glass ceramic has a molar volume of 23.5 $cm^3/mol$, wherein the molar volume of the reinforced glass ceramic was calculated according to the equation: $V_m=\Sigma x_i M_i/\rho$, where $V_m$ is the molar volume of the reinforced glass ceramic; $x_i$ and $M_i$ are the molar fraction and molar mass of each oxide constituting the reinforced glass ceramic, respectively; and $\rho$ is the density of the glass article of the reinforced glass ceramic.

To be illustrative, the reinforced glass ceramic has a tensile strength linear density of 50000 MPa/mm, a depth of compressive stress layer of 100 µm, and a surface compressive stress of 790 MPa.

In addition, the reinforced glass ceramic has a Young's modulus of 86.5 GPa, and an average visible light transmittance of 91%.

This example also provided a method for preparing the reinforced glass ceramic doped with rare earth, comprising:

a. preparing a glass article as a glass ceramic precursor according to the mole percent of each raw material;

b. performing a first heat treatment on the glass article obtained in step a at 540° C. for 2 hours;

c. performing a second heat treatment on the product obtained in step b at 640° C. for 0.5 hour to obtain a glass ceramic;

d. performing a first ion exchanging on the glass ceramic prepared in step c in a first salt bath containing 60% of $NaNO_3$ and 40% of $KNO_3$ at 460° C. for 4 hours;

e. performing a second ion exchanging on the product obtained in step d in a second salt bath containing 100% of $KNO_3$ at 460° C. for 2 hours to prepare the reinforced glass ceramic.

The reinforced glass ceramic doped with rare earth was prepared by heat-treating and ion-exchanging the glass article doped with rare earth oxides $La_2O_3$ and $Nb_2O_5$. This reinforced glass ceramic doped with rare earth has small crystal size and a high crystal ratio due to the high field strength and high accumulation effect of the rear earth elements, which could effectively improve the mechanical properties and visible light transmittance of glass ceramic, as well as effectively control the homogeneous crystallization of glass. It can be used for cover plates of electronic devices.

EXAMPLE 9

In a specific embodiment, the present invention provided a reinforced glass ceramic doped with rare earth, wherein the raw material of the reinforced glass ceramic comprises rare earth oxide $La_2O_3$, the reinforced glass ceramic comprises the crystal phases of lithium disilicate, petalite and β-quartz solid solution, and crystals in a crystal phase of the reinforced glass ceramic have a size range of 30-45 nm.

In this example, the reinforced glass ceramic doped with rare earth was prepared from the following components in mole percentage: 75 mol % of $SiO_2$, 3 mol % of $Al_2O_3$, 1 mol % of $P_2O_5$, 1 mol % of $B_2O_3$, 0.8 mol % of MgO, 0.5 mol % of ZnO, 1.5 mol % of $ZrO_2$, 1 mol % of $Na_2O$, 10 mol % of $Li_2O$, 0.5 mol % of $CeO_2$, 0.15 mol % of $SnO_2$, and 6 mol % of $La_2O_3$.

To be illustrative, the rare earth oxide has a mole percent of 6 mol %.

The reinforced glass ceramic has a molar volume of 22.3 $cm^3$/mol, wherein the molar volume of the reinforced glass ceramic was calculated according to the equation: $V_m = \Sigma x_i M_i/\rho$, where $V_m$ is the molar volume of the reinforced glass ceramic; $x_i$ and $M_i$ are the molar fraction and molar mass of each oxide constituting the reinforced glass ceramic, respectively; and $\rho$ is the density of the glass article of the reinforced glass ceramic.

To be illustrative, the reinforced glass ceramic has a tensile strength linear density of 42000 MPa/mm, a depth of compressive stress layer of 89 μm, and a surface compressive stress of 730 MPa.

In addition, the reinforced glass ceramic has a Young's modulus of 89.3 GPa, and an average visible light transmittance of 91.2%.

This example also provided a method for preparing the reinforced glass ceramic doped with rare earth, comprising:

a. preparing a glass article as a glass ceramic precursor according to the mole percent of each raw material;

b. performing a first heat treatment on the glass article obtained in step a at 530° C. for 2 hours;

c. performing a second heat treatment on the product obtained in step b at 620° C. for 1.5 hours to obtain a glass ceramic;

d. performing an ion exchanging on the glass ceramic obtained in step c in a salt bath containing 30% of $NaNO_3$, 65% of $KNO_3$ and 5% of $LiNO_3$ at 400° C. for 20 hours to prepare the reinforced glass ceramic.

The reinforced glass ceramic doped with rare earth was prepared by heat-treating and ion-exchanging the glass article doped with rare earth oxide $La_2O_3$. This reinforced glass ceramic doped with rare earth has small crystal size and a high crystal ratio due to the high field strength and high accumulation effect of the rear earth elements, which could effectively improve the mechanical properties and visible light transmittance of glass ceramic, as well as effectively control the homogeneous crystallization of glass. It can be used for cover plates of electronic devices.

EXAMPLE 10

In a specific embodiment, the present invention provided a reinforced glass ceramic doped with rare earth, wherein the raw material of the reinforced glass ceramic comprises rare earth oxide $Y_2O_3$, the reinforced glass ceramic comprises the crystal phases of lithium disilicate, petalite and β-quartz solid solution, and crystals in a crystal phase of the reinforced glass ceramic have a size range of 35-40 nm.

In this example, the reinforced glass ceramic doped with rare earth was prepared from the following components in mole percentage: 75 mol % of $SiO_2$, 3 mol % of $Al_2O_3$, 1 mol % of $P_2O_5$, 1 mol % of $B_2O_3$, 0.8 mol % of MgO, 0.5 mol % of ZnO, 1.5 mol % of $ZrO_2$, 1 mol % of $Na_2O$, 10 mol % of $Li_2O$, 0.5 mol % of $CeO_2$, 0.15 mol % of $SnO_2$, and 6 mol % of $Y_2O_3$.

To be illustrative, the rare earth oxide has a mole percent of 6 mol %.

The reinforced glass ceramic has a molar volume of 22.2 $cm^3$/mol, wherein the molar volume of the reinforced glass ceramic was calculated according to the equation: $V_m = \Sigma x_i M_i/\rho$, where $V_m$ is the molar volume of the reinforced glass ceramic; $x_i$ and $M_i$ are the molar fraction and molar mass of each oxide constituting the reinforced glass ceramic, respectively; and $\rho$ is the density of the glass article of the reinforced glass ceramic.

To be illustrative, the reinforced glass ceramic has a tensile strength linear density of 43000 MPa/mm, a depth of compressive stress layer of 90 μm, and a surface compressive stress of 740 MPa.

In addition, the reinforced glass ceramic had a Young's modulus of 89.5 GPa, and an average visible light transmittance of 90.3%.

This example also provided a method for preparing the reinforced glass ceramic doped with rare earth, comprising:

a. preparing a glass article as a glass ceramic precursor according to the mole percent of each raw material;

b. performing a first heat treatment on the glass article obtained in step a at 550° C. for 2.5 hours;

c. performing a second heat treatment on the product obtained in step b at 610° C. for 1 hour to obtain a glass ceramic;

d. performing an ion exchanging on the glass ceramic obtained in step c in a salt bath containing 32% of $NaNO_2$, 65% of $KNO_3$ and 3% of $LiNO_3$ at 480° C. for 8 hours to prepare the reinforced glass ceramic.

The reinforced glass ceramic doped with rare earth was prepared by heat-treating and ion-exchanging the glass article doped with rare earth oxide $Y_2O_3$. This reinforced glass ceramic doped with rare earth has small crystal size and a high crystal ratio due to the high field strength and high accumulation effect of the rear earth elements, which could effectively improve the mechanical properties and visible light transmittance of glass ceramic, as well as effectively control the homogeneous crystallization of glass. It can be used for cover plates of electronic devices.

EXAMPLE 11

In a specific embodiment, the present invention provided a reinforced glass ceramic doped with rare earth, wherein the raw material of the reinforced glass ceramic comprises rare earth oxide $Tm_2O_3$, the reinforced glass ceramic comprises the crystal phases of lithium disilicate and petalite, and crystals in a crystal phase of the reinforced glass ceramic have a size range of 35-50 nm.

In this example, the reinforced glass ceramic doped with rare earth was prepared from the following components in mole percentage: 75 mol % of $SiO_2$, 3 mol % of $Al_2O_3$, 1 mol % of $P_2O_5$, 1 mol % of $B_2O_3$, 0.8 mol % of MgO, 0.5 mol % of ZnO, 1.5 mol % of $ZrO_2$, 1 mol % of $Na_2O$, 10 mol % of $Li_2O$, 0.5 mol % of $CeO_2$, 0.15 mol % of $SnO_2$, and 6 mol % of $Tm_2O_3$.

To be illustrative, the rare earth oxide has a mole percent of 6 mol %.

The reinforced glass ceramic has a molar volume of 22.4 $cm^3$/mol, wherein the molar volume of the reinforced glass ceramic was calculated according to the equation: $V_m=\Sigma x_i M_i/\rho$, where $V_m$ is the molar volume of the reinforced glass ceramic; $x_i$ and $M_i$ are the molar fraction and molar mass of each oxide constituting the reinforced glass ceramic, respectively; and $\rho$ is the density of the glass article of the reinforced glass ceramic.

To be illustrative, the reinforced glass ceramic has a tensile strength linear density of 45000 MPa/mm, a depth of compressive stress layer of 95 μm, and a surface compressive stress of 760 MPa.

In addition, the reinforced glass ceramic has a Young's modulus of 89.8 GPa, and an average visible light transmittance of 91%.

This example also provided a method for preparing the reinforced glass ceramic doped with rare earth, comprising:

a. preparing a glass article as a glass ceramic precursor according to the mole percent of each raw material;

b. performing a first heat treatment on the glass article obtained in step a at 520° C. for 4 hours;

c. performing a second heat treatment on the product obtained in step b at 600° C. for 0.5 hour to obtain a glass ceramic;

d. performing an ion exchanging on the glass ceramic obtained in step c in a salt bath containing 100% of $KNO_3$ at 470° C. for 8.5 hours to prepare the reinforced glass ceramic.

The reinforced glass ceramic doped with rare earth was prepared by heat-treating and ion-exchanging the glass article doped with rare earth oxide $Tm_2O_3$. This reinforced glass ceramic doped with rare earth has small crystal size and a high crystal ratio due to the high field strength and high accumulation effect of the rear earth elements, which could effectively improve the mechanical properties and visible light transmittance of glass ceramic, as well as effectively control the homogeneous crystallization of glass. It can be used for cover plates of electronic devices.

EXAMPLE 12

In a specific embodiment, the present invention provided a reinforced glass ceramic doped with rare earth, wherein the raw material of the reinforced glass ceramic comprises rare earth oxide $Nb_2O_5$, the reinforced glass ceramic comprises the crystal phases of lithium disilicate, petalite, $ZrO_2$ and β-quartz solid solution, and crystals in a crystal phase of the reinforced glass ceramic have a size range of 65-75 nm.

In this example, the reinforced glass ceramic doped with rare earth was prepared from the following components in mole percentage: 75 mol % of $SiO_2$, 3 mol % of $Al_2O_3$, 1 mol % of $P_2O_5$, 1 mol % of $B_2O_3$, 0.8 mol % of MgO, 0.5 mol % of ZnO, 1.5 mol % of $ZrO_2$, 1 mol % of $Na_2O$, 10 mol % of $Li_2O$, 0.5 mol % of $CeO_2$, 0.15 mol % of $SnO_2$, and 6 mol % of $Nb_2O_5$.

To be illustrative, the rare earth oxide has a mole percent of 6 mol %.

The reinforced glass ceramic has a molar volume of 23 $cm^3$/mol, wherein the molar volume of the reinforced glass ceramic was calculated according to the equation: $V_m=\Sigma x_i M_i/\rho$, where $V_m$ is the molar volume of the reinforced glass ceramic; $x_i$ and $M_i$ are the molar fraction and molar mass of each oxide constituting the reinforced glass ceramic, respectively; and $\rho$ is the density of the glass article of the reinforced glass ceramic.

To be illustrative, the reinforced glass ceramic has a tensile strength linear density of 48000 MPa/mm, a depth of compressive stress layer of 110 μm, and a surface compressive stress of 820 MPa.

In addition, the reinforced glass ceramic has a Young's modulus of 88.7 GPa, and an average visible light transmittance of 90.7%.

This example also provided a method for preparing the reinforced glass ceramic doped with rare earth, comprising:

a. preparing a glass article as a glass ceramic precursor according to the mole percent of each raw material;

b. performing a first heat treatment on the glass article obtained in step a at 570° C. for 1.5 hours;

c. performing a second heat treatment on the product obtained in step b at 610° C. for 3 hours to obtain a glass ceramic;

d. performing a first ion exchanging on the glass ceramic prepared in step c in a first salt bath containing 45% of $NaNO_2$ and 55% of $KNO_3$ at 520° C. for 1 hour;

e. performing a second ion exchanging on the product obtained in step d in a second salt bath containing 15% of $NaNO_2$, 80% of $KNO_3$ and 5% of $LiNO_3$ at 400° C. for 1 hour to prepare the reinforced glass ceramic.

Glass article doped with rare earth oxide $Nb_2O_5$ were heat-treated and ion-exchanged to obtain reinforced glass ceramic doped with rare earths. This reinforced glass ceramic doped with rare earth has small crystal size and a high crystal ratio due to the high field strength and high accumulation effect of the rear earth elements, which could effectively improve the mechanical properties and visible light transmittance of glass ceramic, as well as effectively control the homogeneous crystallization of glass. It can be used for cover plates of electronic devices.

To sum up, the reinforced glass ceramic doped with rare earth and the preparation method and use thereof provided by the present invention have the following beneficial effects.

The reinforced glass ceramic doped with rare earth was prepared by heat-treating and ion-exchanging the glass article doped with at least one of rare earth oxides chosen among $Ta_2O_5$, $La_2O_3$, $Y_2O_3$, $Tm_2O_3$, and $Nb_2O_5$. This reinforced glass ceramic doped with rare earth has small crystal size and a high crystal ratio due to the high field strength and high accumulation effect of the rear earth elements, which could effectively improve the mechanical properties and visible light transmittance of glass ceramic, as well as effectively control the homogeneous crystallization of glass. In addition, the reinforced glass ceramic doped with rare earth can be applied to the cover plate of electronic products, further improving the overall performance of the cover plate of electronic products.

The above are merely examples of the present invention, which are not intended to limit the scope of the present invention. Any equivalent structures or equivalent processes made by utilizing the contents of the description of the present invention, or any direct or indirect utilization in other related technical fields, are also included in the protection scope of the present invention.

What is claimed is:

1. A reinforced glass ceramic doped with rare earth, wherein the reinforced glass ceramic is prepared from the following components in mole percentage: from 65% to 75% of $SiO_2$, from 3% to 12% of $Al_2O_3$, from 0.5% to 5% of $P_2O_5$, from 0% to 3% of $B_2O_3$, from 0% to 5% of MgO, from 0% to 3% of ZnO, from 0.5% to 5% of $ZrO_2$, from 0% to 1.5% of $TiO_2$, from 0.5% to 6% of $Na_2O$, from 10% to 25% of $Li_2O$, from 0% to 0.3% of $CeO_2$, from 0% to 0.5% of $SnO_2$, from 1% to 6% of $Tm_2O_3$, and at least one of the following rare earth oxides: from 0% to 6% of $Ta_2O_5$, from 0% to 6% of $Nb_2O_5$, from 0% to 6% of $La_2O_3$, and from 0% to 6% of $Y_2O_3$, the reinforced glass ceramic has a tensile strength linear density ranging from 20000-70000 MPa/mm, a depth of compressive stress layer of 70 μm or more, and a surface compressive stress of 500 MPa or more.

2. The reinforced glass ceramic doped with rare earth according to claim 1, wherein the rare earth oxide has a mole percent of 6% or less.

3. The reinforced glass ceramic doped with rare earth according to claim 1, wherein a crystal phase of the reinforced glass ceramic is at least one of lithium disilicate, $ZrO_2$ crystal, β-quartz solid solution, and petalite; and crystals in the crystal phase have a size ranging from 10-80 nm.

4. The reinforced glass ceramic doped with rare earth according to claim 3, wherein the crystals in the crystal phase have a size ranging from 20-60 nm.

5. The reinforced glass ceramic doped with rare earth according to claim 1, wherein the reinforced glass ceramic has a Young's modulus of more than 80 GPa, and an average visible light transmittance of 89% or more.

6. A method for preparing the reinforced glass ceramic doped with rare earth according to claim 1, comprising:

S1. preparing a glass article as a glass ceramic precursor according to the mole percent of each raw material;

S2. heat-treating the glass article obtained in step S1 to obtain a glass ceramic; and S3. performing an ion exchange on the glass ceramic obtained in step S2 to prepare the reinforced glass ceramic.

7. The method for preparing the reinforced glass ceramic doped with rare earth according to claim 6, wherein the step S2 comprises:

S21. performing a first heat treatment on the glass article obtained in step S1; and S22. performing a second heat treatment on the product obtained in step S21 to prepare the glass ceramic.

8. The method for preparing the reinforced glass ceramic doped with rare earth according to claim 7, wherein the first heat treatment is performed at a temperature of 500-650° C. for a time of 0.5-5 hours.

9. The method for preparing the reinforced glass ceramic doped with rare earth according to claim 8, wherein the second heat treatment is performed at a temperature of 600-750° C. for a time of 0.5-5 hours.

10. The method for preparing the reinforced glass ceramic doped with rare earth according to claim 6, wherein the ion exchange is a kind of single chemical strengthening or multiple chemical strengthening in a salt bath, wherein the salt bath comprises at least one of potassium salt, sodium salt, and lithium salt, and wherein the potassium salt is $KNO_3$, the sodium salt is $NaNO_3$ or $NaNO_2$, and the lithium salt is $LiNO_3$.

11. The method for preparing the reinforced glass ceramic doped with rare earth according to claim 10, wherein in the salt bath for the single chemical strengthening, the mass fraction of the sodium salt ranges from 0.5% to 30%, the mass fraction of the lithium salt ranges from 0% to 5%, and the mass fraction of the potassium salt ranges from 65% to 100%.

12. The method for preparing the reinforced glass ceramic doped with rare earth according to claim 11, wherein the multiple chemical strengthening is a double chemical strengthening, and the salt bath for the double chemical strengthening comprises a first salt bath and a second salt bath.

13. The method for preparing the reinforced glass ceramic doped with rare earth according to claim 12, wherein the sodium salt in the first salt bath has a mass fraction ranges from 30% to 100%, and the potassium salt has a mass fraction ranges from 0% to 70%.

14. The method for preparing the reinforced glass ceramic doped with rare earth according to claim 13, wherein the sodium salt in the second salt bath has the mass fraction ranges from 0% to 15%, the lithium salt has a mass fraction ranges from 0% to 5%, and the potassium salt has a mass fraction ranges from 80% to 100%.

15. The method for preparing the reinforced glass ceramic doped with rare earth according to claim 14, wherein the single chemical strengthening or the multiple chemical strengthening is performed at a temperature of 400-520° C. for a total time of 2-20 hours.

16. A cover plate of an electronic product, comprising the reinforced glass ceramic doped with rare earth according to claim 1.

17. A reinforced glass ceramic doped with rare earth, wherein a raw material of the reinforced glass ceramic comprises at least one rare earth oxides selected from the group consisting of $Ta_2O_5$, $La_2O_3$, $Y_2O_3$, $Tm_2O_3$ and $Nb_2O_5$;

the reinforced glass ceramic is prepared from the following components in mole percentage: from 65% to 75% of $SiO_2$, from 3% to 12% of $Al_2O_3$, from 0.5% to 5% of $P_2O_5$, from 0% to 3% of $B_2O_3$, from 0% to 5% of MgO, from 0% to 3% of ZnO, from 0.5% to 5% of $ZrO_2$, from 0% to 1.5% of $TiO_2$, from 0.5% to 6% of $Na_2O$, from 10% to 25% of $Li_2O$, from 0% to 0.3% of $CeO_2$, and from 0% to 0.5% of $SnO_2$; and at least one of the following rare earth oxides: from 0% to 6% of $Ta_2O_5$, from 0% to 6% of $La_2O_3$, from 0% to 6% of $Y_2O_3$, from 0% to 6% of $Tm_2O_3$, and from 0% to 6% of $Nb_2O_5$; and the reinforced glass ceramic has a tensile strength linear density ranging from 20000-70000 MPa/mm, a depth of compressive stress layer of 70 μm or more, and a surface compressive stress of 500 MPa or more.

18. The reinforced glass ceramic doped with rare earth according to claim 17, wherein a crystal phase of the reinforced glass ceramic is at least one of lithium disilicate, $ZrO_2$ crystal, β-quartz solid solution, and petalite; and crystals in the crystal phase have a size ranging from 10-80 nm.

19. The reinforced glass ceramic doped with rare earth according to claim 18, wherein the crystals in the crystal phase have a size ranging from 20-60 nm.

20. The reinforced glass ceramic doped with rare earth according to claim 17, wherein the reinforced glass ceramic has a Young's modulus of more than 80 GPa, and an average visible light transmittance of 89% or more.

* * * * *